United States Patent [19]
Sarto et al.

[11] Patent Number: 5,540,320
[45] Date of Patent: Jul. 30, 1996

[54] ADJUSTABLE STAR AND GUIDE CONVEYOR SYSTEM

[75] Inventors: Ronald D. Sarto, Ludington, Mich.; Daniel T. Sarto, Aurora, Ill.; Lyle Lucas, Ludington; Tom Simmonds, Manistee, both of Mich.

[73] Assignee: Change Parts, Inc., Ludington, Mich.

[21] Appl. No.: 342,269

[22] Filed: Nov. 18, 1994

[51] Int. Cl.⁶ .................................................. B65G 47/84
[52] U.S. Cl. ...................................... 198/473.1; 198/481.1
[58] Field of Search .............................. 198/473.1, 478.1, 198/479.1, 480.1, 481.1, 803.11

[56] References Cited

U.S. PATENT DOCUMENTS

| | | | |
|---|---|---|---|
| 1,981,641 | 11/1934 | Benoit | 198/473.1 X |
| 2,324,312 | 7/1943 | Meyer et al. | 198/473.1 X |
| 3,957,154 | 5/1976 | Shiba | 198/473.1 X |
| 5,046,599 | 9/1991 | Hamano | 198/473.1 X |
| 5,082,105 | 1/1992 | Tincati | 198/473.1 |

FOREIGN PATENT DOCUMENTS

| | | | |
|---|---|---|---|
| 0046469 | 6/1936 | France | 198/481.1 |
| 1459406 | 11/1966 | France | 198/481.1 |
| 2623309 | 12/1977 | Germany | 198/473.1 |

*Primary Examiner*—James R. Bidwell
*Attorney, Agent, or Firm*—Warner Norcross & Judd

[57] ABSTRACT

An adjustable star and guide conveyor system having adjustable star wheels that accommodate various size containers and an adjustable centerguide assembly that varies the width of the corridor between the wheels and the guide. The star wheel assemblies each include coaxial upper and lower star wheels that cooperate to define the transfer pockets. The size and shape of the transfer pockets are adjusted by rotating the upper and lower wheels with respect to one another. The centerguide assembly includes a pair of siderails that are shaped to follow the contour of the star wheels. The siderails are movable toward and away from the star wheels to vary the width of the corridor between the centerguide assembly and the star wheels.

4 Claims, 4 Drawing Sheets

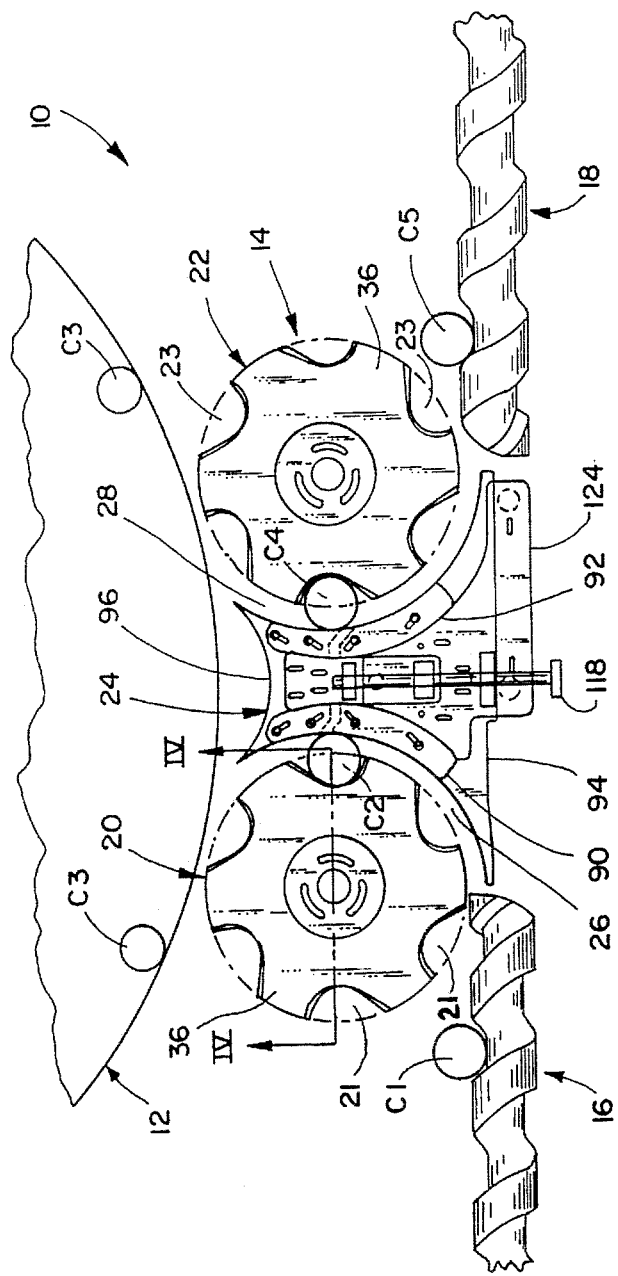

ADJUSTABLE STAR AND GUIDE CONVEYOR SYSTEM

BACKGROUND OF THE INVENTION

The present invention relates to conveyor systems, and more particularly, to a star and guide conveyor system.

Star and guide conveyor systems have long been used in the packaging industry to convey containers from one location to another. Typically, star and guide conveyor systems are used to transfer containers into and out of rotary style filling and capping machines. A conventional star and guide conveyor includes a pair of star wheel assemblies positioned on opposite sides of a centerguide assembly. Each star wheel assembly includes top and bottom star wheels that are spaced apart to separately engage top and bottom portions of the container. The periphery of each star wheel is shaped to form a number of evenly spaced transfer pockets that scoop containers into the star and guide conveyor system one at a time as the wheel rotates. The centerguide assembly is located between the two star wheels and has a somewhat hour-glass shape that follows a portion of the periphery of both wheels. The centerguide assembly includes top and bottom guides that are positioned adjacent to the top and bottom wheels. The centerguide assembly is spaced apart from the star wheel assemblies to define a corridor of the appropriate width to hold the containers in the transfer pockets.

In a conventional arrangement, a timing conveyor, such as a timing auger, delivers containers to the star and guide conveyor along a path substantially tangent to the star wheel. The transfer pockets of the first rotating star wheel assembly sequentially engage the spaced apart containers to draw them into the star and guide conveyor. As the assembly rotates, the container is conveyed around a portion of the periphery of the wheels through the corridor defined between the wheels and the centerguide assembly. The centerguide assembly holds the container in the transfer pockets as it moves through the corridor. When the container exits the corridor, continued rotation of the star wheel assembly causes the container to pass out of the transfer pockets onto the rotary table or packaging machine. The containers are filled, capped, or otherwise processed as they are moved to the discharge end of the packaging machine. The second star wheel assembly is located adjacent to the discharge end of the packaging machine to take the containers from the packaging machine. The transfer pockets of the second rotating star wheel assembly sequentially engage the containers to support and guide them as they disengage the filler nozzle or capper chuck. The star wheel assembly proceeds to convey the containers around a portion of the periphery of the wheels through the corridor defined by the centerguide assembly and second star wheel assembly. Again, the centerguide assembly holds each container in the transfer pockets until the appropriate time for it to be released to an outfeed conveyor.

The geometry of the transfer pocket and its spacing from the centerguide determine which size and shape container can be conveyed by a particular set of stars and guides. For example, containers having a larger cross sectional area require larger transfer pockets and a larger corridor between the wheels and centerguide, while containers having a small cross sectional area require smaller pockets and a smaller corridor.

One method for switching between different size containers is to provide interchangeable sets of star wheels and centerguides. The various star wheels have different size and shape transfer pockets each specifically designed to convey a specific container. In addition, the various centerguides are dimensioned to provide the appropriate corridor width for a specific container. Each time the star wheels and centerguide are converted, the system must be re-timed to correspond to the movement of the timing conveyor, packaging machine and outfeed conveyor. Changeover is labor intensive and time consuming.

To overcome the problems associated with changeover, star wheels have been provided with spring-biased arms located in each of the transfer pockets. The spring-biased arms pivot from the leading edge of each transfer pocket backward toward the trailing edge. As a result, the arm engages the sidewall of the container forcing it backward against the trailing end of the transfer pocket allowing a single star wheel to accommodate various size containers.

However, when the spring-biased arm forces the container backward in the transfer pocket, it also shifts the filler neck of the container backward. This backward shift of the container throws off the timing of the system causing the neck opening of smaller containers to arrive at the filling or capping station later in the packaging machine's timing cycle. Timing errors can result in drips, spills, broken filler nozzles, and crossthreaded or uncapped containers.

In addition, smaller size containers are inadequately supported when they are transferred through the corridor between the star wheel assemblies and the centerguide assembly. The fixed spacing between the star wheels and centerguide assembly is designed to accommodate the largest diameter container accepted by the star wheels. As a result, when smaller sized containers are conveyed through the corridor they do not contact the centerguide assembly. Because the container is not supported on both sides, it may float out of the transfer pockets or even tip over spilling the contents and potentially blocking the corridor.

In an attempt to overcome the problems associated with a fixed width corridor, the centerguide assembly has been provided with a spring-biased arm pivotally attached to the centerguide at the trailing end of the corridor. The spring-biased arm contacts the sidewall of the container urging it backward in the transfer pockets to ensure that the container is properly aligned as it reaches the packaging machine. The spring-biased arm only contacts the container at the end of the corridor. As a result, the container is free to float or tip throughout most of the corridor.

SUMMARY OF THE INVENTION

The aforementioned problems are overcome by the present invention which provides an adjustable star and guide assembly that includes adjustable star wheels each having coaxial upper and lower wheels that are radially shiftable with respect to one another to vary the size of the transfer pocket. The present invention also provides an adjustable centerguide assembly having front and back portions that move toward and away from each other to extend and retract a pair of siderails.

In general, the present invention includes a pair of star wheel assemblies located on opposite sides of a centerguide assembly. The star wheel assemblies each include top and bottom star wheel decks that correspond to conventional top and bottom star wheels. Each star wheel deck includes upper and lower coaxial star wheels each having a series of cutouts. The cutouts of the upper star wheel overlap and cooperate with the cutouts of the lower star wheel to define the transfer pockets. The size and shape of the transfer pockets is varied by rotating the upper and lower star wheels with respect to each other.

The centerguide assembly includes a pair of siderails extending between movable front and back centerguide portions. The siderails are slide mounted to opposite centerguide portions by bolts extending through oppositely skewed slots so that the siderails extend and retract as the centerguide portions are moved toward and away from each other, respectively.

The present invention provides a simple and effective adjustable star and guide conveyor system. The size of the transfer pockets is readily adjusted to accommodate containers of various shapes and sizes. Likewise, the width of the corridor between the star wheels and centerguide assembly is readily adjusted to support various size and shape containers throughout the entire corridor. The overlapping arrangement of the star wheel cutouts maintains a consistent centerline for various size containers thereby eliminating the need to re-time the system during changeover.

These and other objects, advantages, and features of the invention will be more readily understood and appreciated by reference to the detailed description of the preferred embodiment and the drawings.

BRIEF DESCRIPTION OF THE DRAWINGS

FIG. 1 is a top plan view of a container handling system incorporating a star and guide conveyor according to the present invention;

FIG. 2 is a side elevational view of the star and guide conveyor;

DETAILED DESCRIPTION OF THE PREFERRED EMBODIMENT

Figure 3:
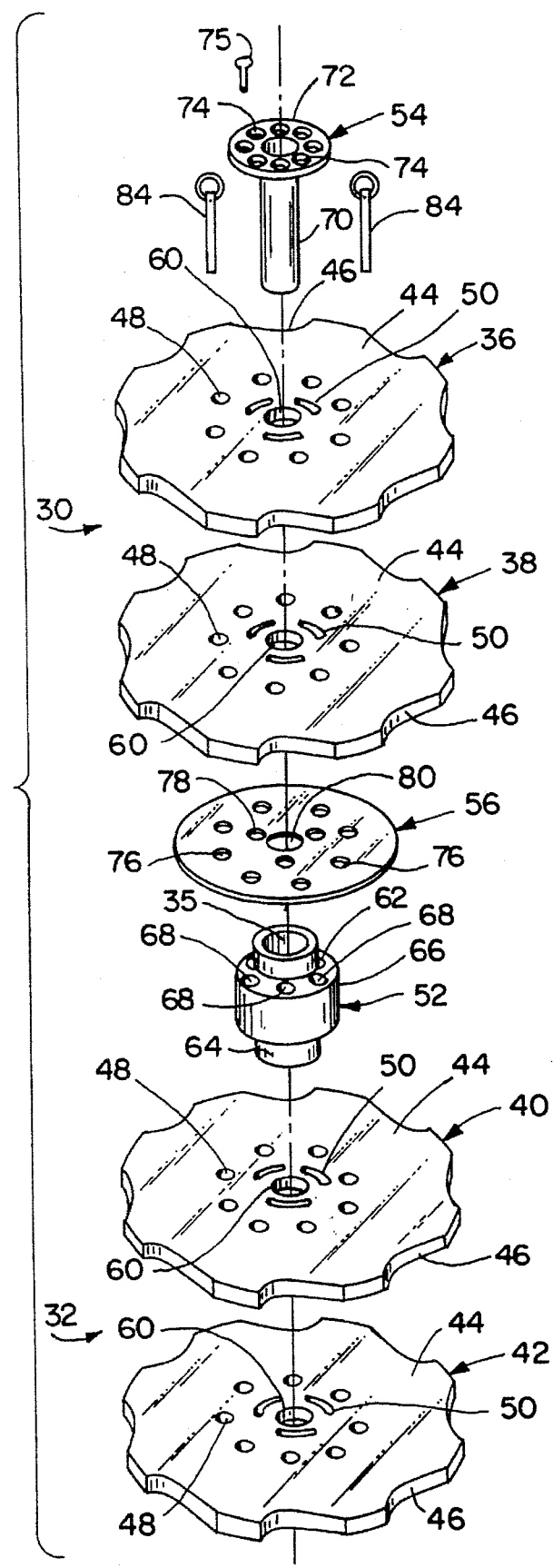
FIG. 3 is an exploded perspective view of the star wheel assembly.

A container handling system incorporating an adjustable star and guide conveyor according to the present invention is illustrated in FIG. 1, and generally designated 10. The handling system 10 includes a conventional rotary filling machine 12, an adjustable star and guide conveyor 14, a conventional infeed conveyor 16, and a conventional outfeed conveyor 18. Containers C1 arrive at the infeed conveyor 16 which acts as a timing conveyor to both space the containers C1 and move them to the star and guide conveyor 14. The containers C2 are then transferred in seriatim to the filling machine 12 by the star and guide conveyor 14. The filling machine 12 lifts the containers C3 to a filling nozzle (not shown), fills the containers C3, and passes the containers C3 back to the star and guide conveyor 14. The star and guide conveyor transfers the containers C4 to the outfeed conveyor 18 which typically moves the containers C5 to a conventional rotary capping machine (not shown).

Referring now to FIGS. 1 and 2, the star and guide conveyor 14 generally includes an infeed star wheel assembly 20, an outfeed star wheel assembly 22, and a centerguide assembly 24. The two star wheel assemblies 20, 22 are spaced apart on opposite sides of the centerguide assembly 24 to define infeed and outfeed corridors 26, 28 therebetween. The infeed conveyor 16 approaches the star and guide conveyor 14 along a path substantially tangent to the infeed star wheel assembly 20. As containers C1 travel along the infeed conveyor 16, the transfer pockets 21 of infeed star wheel assembly 20 scoop them one at a time from the infeed conveyor 16 and move them into and through the infeed corridor 26. The centerguide assembly 24 holds the containers C2 in the transfer pockets 21. The infeed corridor 26 is dimensioned to correspond to the width of the containers C2. The centerguide assembly 24 can be adjusted to vary the width of the corridor 26 to accommodate various size and shape containers.

At the discharge end of the infeed corridor 26, the containers C2 move beyond the centerguide assembly 24 and follow a path substantially tangent to the filling machine ultimately passing the containers C2 from the star wheel assembly 20 to the filling machine. After the containers C3 are processed by the filling machine they enter a path tangent to the outfeed star wheel assembly 22.

The transfer pockets 23 of the outfeed star wheel assembly scoop the containers C3 one at a time from the filling machine and move them into the outfeed corridor 28. Again, the centerguide assembly holds the containers C3 in the transfer pockets 23 of the outfeed star wheel assembly 22 until the containers C3 pass from the outfeed corridor 28. The outfeed conveyor 18 is disposed substantially tangent to the outfeed star wheel assembly immediately adjacent the end of the outfeed corridor 28. As a result, containers C4 pass from the outfeed star wheel assembly directly to the outfeed conveyor 18 as they exit the outfeed corridor 28.

The infeed and outfeed star wheel assemblies 20, 22 are mounted to conventional driving apparatus, such as spindles, which rotate the star wheel assemblies during operation. Each star wheel assembly includes spaced apart top and bottom coaxial star wheel decks 30, 32, respectively. The two decks 30, 32 are positioned to separately engage upper and lower portions of the container. Each deck 30, 32 includes an upper star wheel 36, 40 and a lower star wheel 38 and 42. The star wheels are preferably manufactured from an acetyl copolymer. However, a variety of other materials are suitable. Referring also to FIG. 3, all four star wheels are generally identical and include a circular plate 44 with radially symmetric cutouts 46. A series of locating holes 48 and radially symmetric timing slots 50 are formed through each plate 44. The locating holes 48 are arranged in pairs that are comprised of two holes spaced 180° apart from each other. Each pair of locating holes 48 is preferably spaced a different distance from the center of the star wheel. This ensures that each pair of locating holes 48 in the upper star wheels 36, 40 align only with one corresponding pair of locating holes 48 in the lower star wheels 38, 42. The locating holes 48 in the lower star wheels 38 and 42 are angularly offset from the locating holes in the upper star wheels 36, 40 as necessary to provide the desired variations in overlap between the cutouts 46. Further, a center hole 60 extends through the center of each plate.

The top and bottom decks 30, 32 are interconnected by a spacer hub 52, timing hub 54, and a timing plate 56. The spacer hub 52 includes a pair of necks 62, 64 extending from opposite longitudinal ends of a cylindrical spacer 66. A plurality of radially symmetric timing holes 68 extend longitudinally through the spacer 66. The timing hub 54 includes a cylindrical stem 70 extending from a concentric hub 72. A plurality of radially symmetric timing holes 74 extend through the hub 72. Timing plate 56 is a generally circular plates formed with a plurality of locating holes 76, a plurality of timing holes 78, and a center hole 80. Optionally, a second timing plate may be located between the lower deck 32 and the spacer hub 34 to strengthen the star wheels 40, 42.

Figure 4:
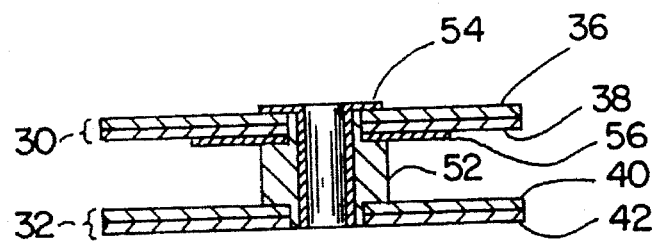
FIG. 4 is a sectional view of the star wheel assembly drawn along line IV—IV of FIG. 1.

Assembly of the star wheel assembly is described in connection with FIGS. 2–4. In general, timing hub 54 and bottom deck 32 sandwich top deck 30, timing plate 56, and spacer hub 52. The spacer hub 52 includes an internal bore 35 of sufficient diameter fit over the stem 70 of the timing hub 54. The spacer 66 is disposed between the two decks to maintain appropriate spacing therebetween. Necks 62 and 64 surround stem 70 and fit within the center holes 60, 80 of the timing plate and star wheels. Timing bolts 75 extend through timing holes 74, 78, and 68 and timing slots 50. Alternatively, a first set of bolts (not shown) may extend downwardly through the timing hub 54 and upper deck 30 to threadedly engage the spacer hub 34 and a second set of bolts (not shown) may extend upwardly through the lower deck 32 to threadedly engage the spacer hub 34. In this manner, the upper and lower decks 30, 32 may be secured to the spacer hub 34 by separate sets of bolts. A pair of locking pins 84 extend through any of the pairs of locating holes 48 and 76 to lock the star wheels in a specific alignment. The size and shape of the transfer pockets is adjusted by removing the locking pins, rotating the upper and lower star wheels with respect to each other until the appropriate locating holes 48 are aligned, and then reinserting the locking pins.

Optionally, the star wheels of the top and bottom decks can be intersecured so that movement of the star wheels of either deck causes identical movement of the star wheels of the opposite deck. For example, the two decks can be intersecured by connecting rods (not shown) extending between upper star wheel 36 and lower star wheel 42 through slots (not shown) formed in lower star wheel 38 and upper star wheel 40.

Figure 6:
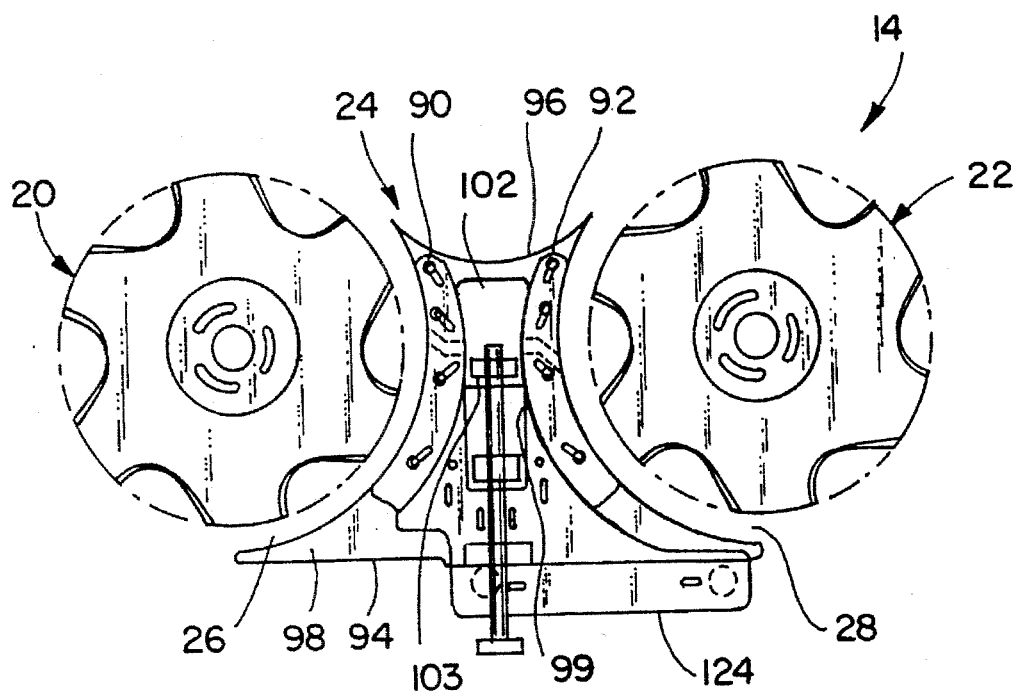
FIG. 6 is a top plan view of the centerguide assembly with the siderails in the extended position.
Figure 5:
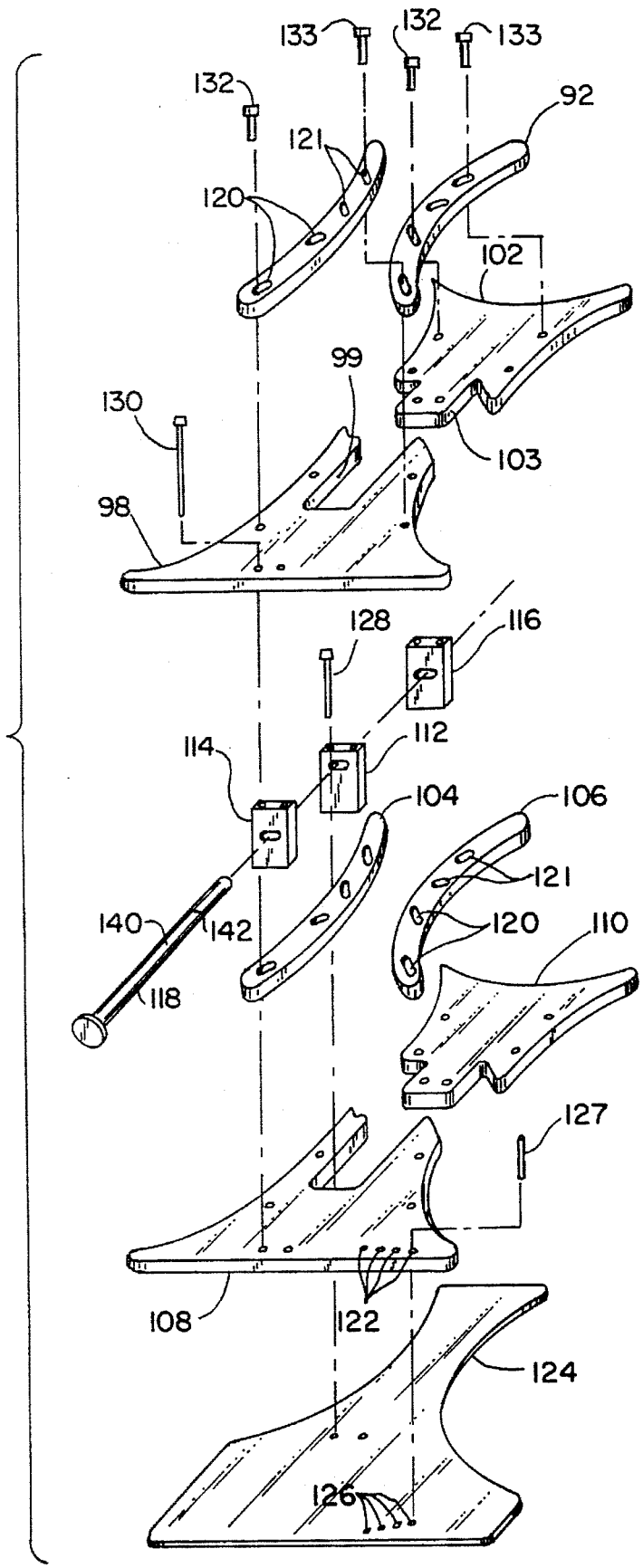
FIG. 5 is an exploded perspective view of the centerguide assembly.

Referring now to FIGS. 5 and 6, the centerguide assembly is movably mounted to baseplate 124 and generally includes a pair of top siderails 90, 92 and bottom siderails 104, 106 extending between front and back guide assemblies 94, 96, respectively. The front guide assembly 94 includes top and bottom guide members 98, 108 connected to one another by spacer 114. Both guide members 98, 108 include a rectangular slot 99. The guide members 98, 108 are shaped to follow the peripheral edges of the star wheels. Bottom guide member 108 includes a series of laterally aligned alignment holes 122. An alignment pin 127 extends through one of the alignment holes 122 into one of a series of laterally offset alignment holes 126 formed in the baseplate 124. Movement of bottom guide member 108 causes different pairs of alignment holes 122, 126 to align.

The back guide assembly 96 includes top and bottom guide members 102, 110 connected to one another by spacer 116. Each guide member 102, 110 includes a tongue 103 that slidably fits within slot 99. An alignment spacer 112 is mounted to the baseplate 124 by conventional bolts. A threaded rod 118 having a left-hand threaded portion 140 and a right-hand threaded portion 142 is rotatably affixed to alignment spacer 112. The left-hand threaded portion 140 threadedly engages spacer 114 and the right-hand portion threadedly engages spacer 116. As a result, rotation of threaded rod 118 draws together and pushes apart the front and back guide assemblies 94, 96.

The siderails 90, 92 are arcuate members shaped to follow the peripheral edge of the star wheels and provide a guide wall to shepherd containers through infeed and outfeed corridors 26, 28. The two siderails 90, 92 are mirror images of one another and include a series of skewed mounting slots 120, 121. A plurality of bolts 132, 133 extend through the slots 120, 121 to slidably secure the siderails 90, 92 to the guide assemblies 94, 96. Slots 120 and slots 121 are skewed in opposite directions from each other so that the siderails extend into and retract from the infeed and outfeed corridors when the guide assemblies 94, 96 are moved together and apart, respectively.

OPERATION

In operation, calibration of the star and guide conveyor 10 for the initial run typically requires both timing and sizing. Changeover to different size or shape containers typically requires only re-sizing. To time the star and guide conveyor 10, the timing bolts 75 are loosened, and the star wheel assemblies 20 and 22 are rotated as a unit with respect to the timing hub 54 so that the containers move smoothly between the conveyors and the packaging machine. It may also be necessary to adjust the timing of the infeed and outfeed conveyors to achieve proper timing.

To size the star and guide conveyor, the size of the transfer pockets 21, 23 must be adjusted to accommodate the containers to be processed by the system. In addition, the width of the infeed and outfeed corridors 26, 28 must be adjusted to correspond to the width of the containers. The size and shape of the transfer pockets 21, 23 is adjusted by removing the locking pins 84 and rotating the upper and lower star wheels with respect to each other until the appropriate set of locating holes 48, 76 are aligned. Once both top and bottom decks are properly adjusted, the locking pins 84 are reinserted through the star wheels and timing plates to lock the star wheels in place. The positions of the locating holes 48, 76 are selected to accommodate a number of bottles with different size cross sections.

Next, the centerguide assembly 24 is adjusted to provide the appropriate size infeed and outfeed corridors. To adjust the centerguide assembly, the alignment pin 127 is removed from the baseplate 124 and bottom member 108 of the front centerguide assembly. The adjustment rod 118 is rotated either clockwise or counter-clockwise to draw together or force apart the front and back centerguide assemblies until the appropriate alignment holes 122, 126 are aligned. As described above, relative movement of the front and back centerguide assemblies automatically extends and retracts the siderails 90, 92, 104, and 106 as bolts 132, 133 interact with skewed slots 120, 121. Once the proper locating holes 122, 126 are aligned, the alignment pin 127 is reinserted to lock the centerguide in place.

In an alternative embodiment, the locating holes and locking pins are eliminated and the star wheels are locked in the appropriate position by tightening the timing bolts extending through slots 50. In this embodiment, the transfer pockets are adjusted by loosening the timing bolts and shifting the star wheels. Alignment marks on the side of each star wheel and timing plate indicate when the proper adjustment has been reached.

In a second alternative embodiment, alignment marks are used to ensure proper adjustment of the centerguide assembly. In this embodiment, the alignment holes and alignment pin are eliminated and a threaded jamnut is provided to lock the guide in place when the proper adjustment position has been reached.

In yet another alternative embodiment, extension and retraction of the siderails is achieved by a conventional rack and pinion arrangement. In this embodiment, the skewed slot and bolt arrangement is eliminated and the adjustment rod includes a pinion gear. A rack extends from each of the movable siderails to engage the pinion gear. Rotation of the adjustment rod produces linear movement of the rack to adjust the position of the siderail. Alignment marks may be provided to ensure proper adjustment of the siderails.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents.

The embodiments of the invention is which an exclusive property or privilege is claimed are defined as follows:

1. An adjustable star and guide conveyor, comprising:

an infeed star wheel assembly having a first pair of coaxial upper and lower star wheels, each of said wheels having a cutout, whereby said cutout of said upper wheel cooperates with said cutout of said lower star wheel to define a transfer pocket having a size and shape, said upper and lower star wheels each including timing slots; said infeed star wheel assembly including a timing and a timing means for selectively adjusting said timing of said infeed star wheel assembly, said timing means including a plurality of timing bolts, a timing hub, and a timing plate, said timing hub and said timing plate each having a plurality of timing holes, whereby said timing bolts extend through said timing holes and said timing slots to lock said star wheels in place;

infeed star wheel adjustment means for radially shifting said upper and said lower star wheels with respect to one another to vary said size and said shape of said transfer pocket, said infeed star wheel adjustment means including locating means for positively securing said upper and said lower star wheels in one of a number of positions relative to one another, said infeed star wheel locating means including a locking pin extending through a plurality of locating holes formed in said star wheels and said timing means;

a centerguide assembly having an infeed siderail, said infeed siderail mounted adjacent said infeed star wheel to define an infeed corridor therebetween; and centerguide adjustment means for adjusting the width of said infeed corridor between said star wheel assembly and said infeed siderail.

2. The star and guide conveyor of claim 1, further comprising a second pair of upper and lower star wheels, said second pair of star wheels spaced apart from and coaxially aligned with said first pair of star wheels.

3. The star and guide conveyor of claim 2, further comprising an outfeed star wheel assembly having coaxial upper and lower star wheels, each of said wheels having a cutout, whereby said cutout of said upper wheel cooperates with the cutout of said lower wheel to define a transfer pocket having a size and shape;

outfeed star wheel adjustment means for radially shifting said upper and lower star wheels with respect to one another to vary said size and said shape of said outfeed star wheel transfer pocket;

wherein said centerguide assembly further includes an outfeed siderail, said outfeed siderail mounted adjacent said outfeed star wheel assembly to define an outfeed corridor therebetween; and centerguide adjustment means for adjusting the width of said outfeed corridor.

4. An improved star and guide conveyor, said conveyor comprising an infeed star wheel assembly having a plurality of radially symmetric transfer pockets for moving containers, and a centerguide assembly spaced apart from said infeed star wheel assembly to define an infeed corridor for shepherding the containers as they are moved by said infeed star wheel assembly, wherein the improvement comprises said centerguide assembly, said centerguide assembly comprising:

at least one siderail movably mounted to said centerguide assembly, said siderail defining a width of said infeed corridor;

adjustment means for selectively moving said siderail toward and away from said star wheel assembly to adjust said width of said infeed corridor, whereby said corridor can accommodate containers of different sizes and shapes, said adjustment means including an adjustment rod having a pinion gear affixed thereto, said siderail being mounted to a rack engaging said pinion gear such that rotation of said adjustment rod results in linear movement of said siderail toward and away from said star wheel assembly; and said centerguide assembly including front and back centerguide assemblies movably interconnected to one another by said adjustment means, said siderail being slidably mounted to said front and said back centerguide assemblies by a plurality of fasteners extending through a plurality of skewed slots, whereby relative movement of said front and said back centerguide assemblies causes said siderail to move toward and away from said star wheel assembly.

* * * * *